United States Patent [19]

Jeunehomme et al.

[11] Patent Number: 5,797,646

[45] Date of Patent: Aug. 25, 1998

[54] RAIL OR ROAD VEHICLE AND A METHOD OF ASSEMBLING IT

[75] Inventors: Sylvie Jeunehomme, Salles sur Mer; Patrick Evennou, St Hilaire des Loges; Joël Hachet, Clavette, all of France

[73] Assignee: GEC Alsthom Transport SA, Paris, France

[21] Appl. No.: 895,568

[22] Filed: Jul. 16, 1997

Related U.S. Application Data

[63] Continuation of Ser. No. 476,568, Jun. 7, 1995, abandoned.

[30] Foreign Application Priority Data

Jun. 13, 1994 [FR] France .................. 94 07196

[51] Int. Cl.⁶ .................. B61D 17/00; B60J 7/00
[52] U.S. Cl. .................. 296/197; 296/178; 296/181; 105/396
[58] Field of Search .................. 296/178, 196, 296/197, 191, 203, 901, 181; 105/396, 397, 329.1

[56] References Cited

U.S. PATENT DOCUMENTS

| | | | |
|---|---|---|---|
| 2,894,783 | 7/1959 | Bird | 296/901 X |
| 3,692,349 | 9/1972 | Ehrich | 296/181 |
| 3,811,721 | 5/1974 | Bolesky | 296/901 X |
| 4,221,426 | 9/1980 | Wardill | 296/178 |
| 4,531,278 | 7/1985 | Boykin | 296/197 X |
| 4,537,441 | 8/1985 | McCleary | 296/181 |
| 4,978,164 | 12/1990 | Nakamura et al. | 296/203 X |
| 5,042,395 | 8/1991 | Wackerle et al. | 296/901 X |
| 5,066,067 | 11/1991 | Ferdows | 296/197 |
| 5,209,541 | 5/1993 | Janotik | 296/203 X |

FOREIGN PATENT DOCUMENTS

| | | |
|---|---|---|
| 0260200A1 | 3/1988 | European Pat. Off. |
| 0544473A1 | 6/1993 | European Pat. Off. |
| 1048294 | 12/1953 | France |
| 640513 | 11/1933 | Germany |

*Primary Examiner*—Joseph D. Pape
*Attorney, Agent, or Firm*—Sughrue, Mion, Zinn, Macpeak & Seas, PLLC

[57] ABSTRACT

The present invention relates to a rail or road vehicle including a chassis and a roof, said chassis and said roof both being structural elements, each of which forms a single unit only, the two elements defining a right side plane and a left side plane; wherein at least one structural frame is disposed in each of said side planes, and is secured at its bottom to said chassis and at its top to said roof, and wherein said frames are the only self-supporting face structures of said vehicle.

14 Claims, 2 Drawing Sheets

5,797,646

RAIL OR ROAD VEHICLE AND A METHOD OF ASSEMBLING IT

This is a Continuation of application Ser. No. 08/476,568 filed Jun. 7, 1995, now abandoned.

The present invention relates to methods of assembling body framework for passenger rail or road vehicles, and more particularly to a rail or road vehicle and to a method of assembling it.

BACKGROUND OF THE INVENTION

U.S. Pat. No. 5,066,067 describes a road vehicle including a chassis and a roof.

The chassis and the roof are both structural elements, each of which forms a single unit.

The chassis and the roof are held together by means of two longitudinally-extending faces defining a right side plane and a left side plane.

The two longitudinally-extending faces are also structural elements, each of which forms a single unit.

Prior art vehicles designed in that way suffer from the following drawbacks:

- for very long vehicles, long face elements must be made, and this requires comprehensive manufacturing and handling tools;
- face sub-assembly elements, in particular totally integrated door and window sub-assemblies, cannot be made separately from one another prior to final assembly of the body, and therefore an intermediate stage is required during which to make the complete face element;
- localized disassembly of a portion only of the face is not possible in the event of localized damage;
- a door cannot be replaced by another door without it being necessary to hang it and adjust it inside the vehicle;
- it is not possible to provide windows and doors that are modular, except by making different face assemblies; and
- since the face is a complete one-piece element, it does not lend itself to combining different materials and techniques.

Document FR-A-2 407 851 to Aluminium Suisse SA describes a body framework for a rail or road vehicle.

The rail or road vehicle described includes a compound chassis welded together from steel parts, and a passenger compartment framework made up of aluminum uprights, doors, and cross-pieces assembled together, of panels fastened by means of an adhesive, and of metal sheets riveted onto cross-pieces for the roofing.

Prior art vehicles designed in that way suffer from the following drawbacks:

- it is only possible to provide connection zones to the chassis and to the roof that are non-continuous and localized; since such localized connections are not rigid enough for applications in which the materials are subjected to large amounts of stress, it is necessary to use a very dense mesh of uprights and of cross-pieces;
- materials other than aluminum or long-type materials cannot be used for the structural portions of the faces;
- face sub-assembly elements, in particular totally integrated door and window sub-assemblies, cannot be made separately from one another prior to final assembly of the body, and therefore an intermediate stage is required during which to make the complete face element; and
- a door cannot be replaced by another door without it being necessary to hang it and adjust it inside the vehicle.

The methods of assembling the various bodywork elements of rail or road vehicles such as described above suffer from the following drawbacks:

- face sub-assembly elements, in particular totally integrated door and window sub-assemblies, cannot be made separately from one another prior to final assembly of the body, and therefore an intermediate stage is required during which to make the complete face element;
- a door cannot be replaced by another door without it being necessary to hang it and adjust it inside the vehicle;
- those methods do not lend themselves to mixing materials and techniques for making the faces.

OBJECTS AND SUMMARY OF THE INVENTION

An object of the invention is to provide a rail or road vehicle and a method of assembling it that do not suffer from the drawbacks of prior art vehicles and assembly methods.

Another object of the invention is to avoid welding so that it is not necessary for dressing operations to be performed prior to painting, and so that costly tools do not need to be used.

Another object of the invention is to enable the various structural assemblies and sub-assemblies to be pre-equipped to a large extent prior to final assembly of the body.

Another object of the invention is to enable the access doors to be hung and adjusted in structural sub-assemblies, and to enable the structural sub-assemblies to be made easily interchangeable without it being necessary to adjust the body of the vehicle.

Another object of the invention is to make it possible for certain face zones not to participate in providing mechanical strength for the body.

Another object of the invention is to avoid subjecting these face zones to stresses, and therefore to enable the materials and techniques used in the structural sub-assemblies to be different from those used in the non-structural sub-assemblies.

Another object of the invention is to make it easy to maintain the vehicle and to repair it in the event of an accident, so as to reduce the time for which damaged vehicles remain out of service.

The invention provides a rail or road vehicle including a chassis and a roof, said chassis and said roof both being structural elements, each of which forms a single unit only, the two elements defining a right side plane and a left side plane; wherein at least one structural frame is disposed in each of said side planes, and is secured at its bottom to said chassis and at its top to said roof, and wherein said frames are the only self-supporting face structures of said vehicle.

The rail or road vehicle of the invention satisfies one of the following characteristics:

- at least one of the frames includes at least one door assembly;
- at least one of the frames includes at least one glazed window assembly;
- at least one of the structural frames includes at least one panel assembly;
- the structural frames are structural elements that are welded, machined, molded, or forged from a composite material, or from a material obtained by any other suitable technique;

the structural frames are fastened to said chassis and to said roof of the vehicle by being bolted or riveted over their entire widths, thereby enabling a connection to be obtained that is continuous and extremely rigid; and the structural frames and their assemblies are, in particular, painted, adjusted, and provided with fittings and/or trim before said structural frames are fastened to said chassis and to said roof.

The invention also provides a method of assembling a rail or road vehicle including a chassis and a roof, said chassis and said roof both being structural elements, each of which forms a single unit only, the two elements defining a right side plane and a left side plane; wherein at least one structural frame is disposed in each of said side planes, and is secured at its bottom to said chassis and at its top to said roof so that said frames are the only self-supporting face structures of said vehicle.

The method of assembling a rail or road vehicle of the invention includes a step that satisfies one of the following characteristics:

at least one door assembly is mounted in at least one of said frames;

at least one glazed window assembly is mounted in at least one of said frames;

at least one panel assembly is mounted in at least one of said frames;

the structural frames are structural elements that are welded, machined, molded, or forged from a composite material or from a material obtained by means of any other suitable technique;

the structural frames are fastened to said chassis and to said roof of the vehicle by being bolted or riveted over their entire widths, thereby enabling a connection to be obtained that is continuous and extremely rigid; and the structural frames and their assemblies are, in particular, painted, adjusted, and provided with fittings and/or trim before said frames are fastened to said chassis and to said roof.

The vehicle of the invention and the method of assembling it in accordance with the invention offer the following advantages:

long connection lengths can be obtained between the structural elements and the chassis, and between the structural elements and the roof, thereby making the resulting unit very rigid;

it is possible to equip the structural frames fully prior to final assembly of the unit, and this is particularly advantageous for the access door structural frames, the access doors being adjusted entirely in the frames;

the frames are easily interchangeable once the unit has been formed;

the non-structural face modules between the frames are easily interchangeable once the unit has been formed;

the non-structural face modules between the structural frames are also fully equipped either with windows or panels prior to assembly of the body;

by splitting up the right side plane and the left side plane into sub-assemblies constituted by structural frames and by non-structural modules, it is possible to achieve economies of scale for the sub-assemblies;

such splitting enables the tools and production resources to be limited to small sub-assemblies;

by splitting up the right side plane and the left side plane into structural frames and non-structural modules, it is possible to use different respective techniques to obtain them so as to optimize the technique to the stresses encountered;

while offering the same interface in the assembled unit, each of structural frames may be equipped with a door, with a window, or with a panel, the technique proposed making it possible to obtain a wide range of configurations, thereby offering modularity;

since the frames are easily interchangeable and may be equipped with doors, with windows, or with panels, it is easy to modify the configuration of the vehicle during its life;

since the face modules between the structural frames are easily interchangeable, it is easy to modify the appearance of the vehicle during its life; and since the various elements of the unit (chassis, roof, structural frames, and face modules) are fully equipped independently of one another, and since they can be manufactured simultaneously rather than sequentially, the time required for the manufacturing cycle is reduced.

Another advantage of the invention is that it makes it possible to minimize the time spent working inside the vehicle.

BRIEF DESCRIPTION OF THE DRAWINGS

Other characteristics and advantages of the invention will be better understood on reading the following description of an embodiment of a vehicle of the invention given with reference to the accompanying drawings, in which.

MORE DETAILED DESCRIPTION

Figure 1:
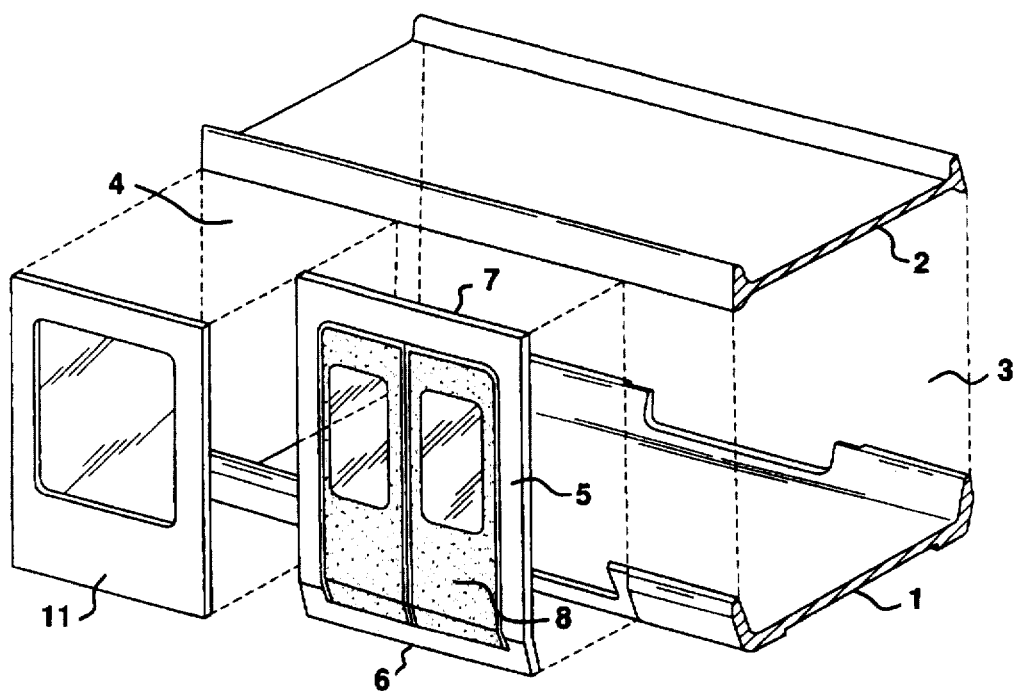
FIGS. 1 to 3 are fragmentary exploded perspective views of a vehicle assembled in compliance with the method of the invention.
Figure 2:
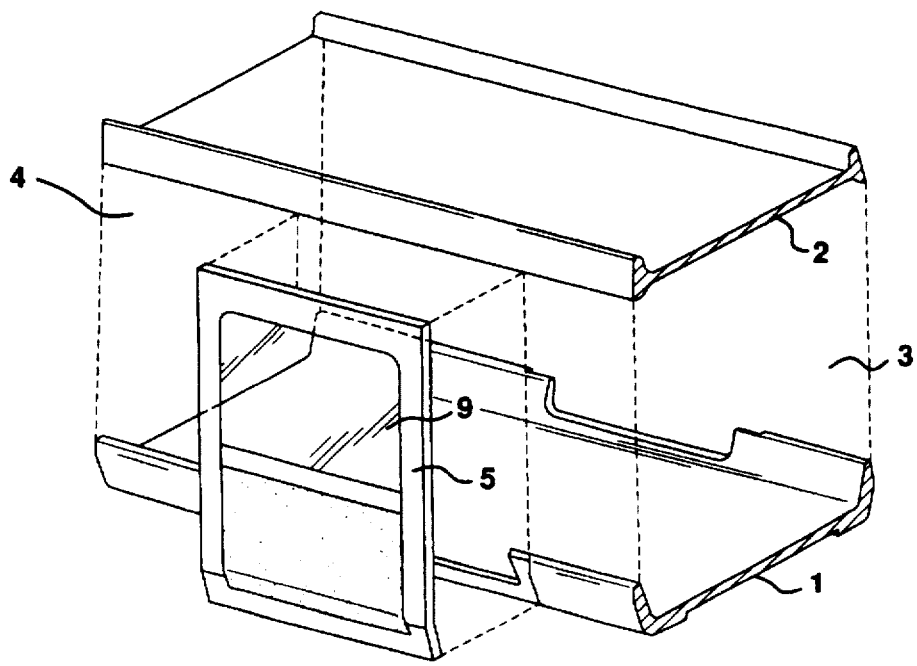
Figure 3:
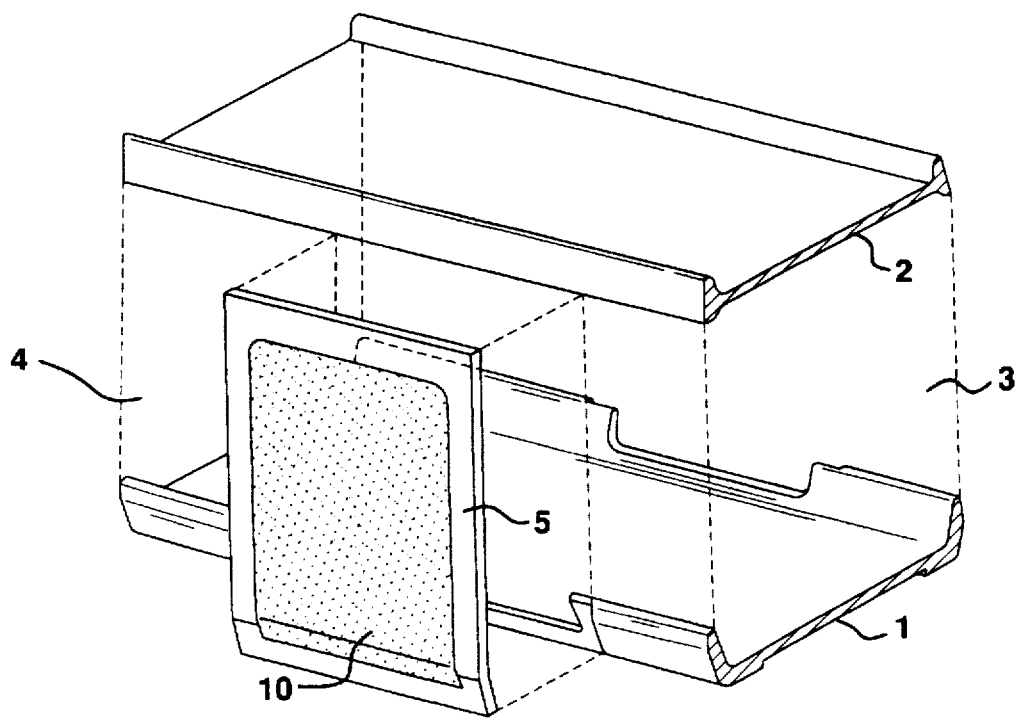

The rail or road vehicle shown in FIGS. 1 to 3 includes a chassis 1 and a roof 2.

The chassis and the roof are both structural elements, each element forming a single unit or piece only.

Once they have been assembled together by at least one structural frame 5 on each side, the chassis and the roof define therebetween a right side plane 3 and a left side plane 4.

In accordance with the invention the, at least one structural frame 5 is disposed in each of the side planes 3 & 4, and it is secured at its bottom 6 to the chassis 1 and at its top 7 to the roof 2.

Furthermore, the frames 5 are the only self-supporting structures of the vehicle.

In accordance with a secondary characteristic of the invention, at least one of the frames 5 includes at least one door assembly 8, at least one glazed window assembly 9, or at least one panel assembly 10.

Generally, the frames 5 are structural elements that are welded, machined, molded, or forged from a composite material, or from a material obtained by means of any other suitable technique.

The frames 5 are fastened to the chassis and to the roof by means of bolts or rivets, or any other suitable fastening means.

The frames 5 and the assemblies that they contain are painted, adjusted, and provided with fittings and/or trim before the frames 5 are fastened to the chassis 1 and to the roof 2.

In this way, the rail or road vehicle of the invention is made up of elements that are painted, adjusted, and provided with fittings and/or trim before they are assembled together.

The chassis and the roof of the vehicle are painted prior to assembly, and they are fully equipped with their respective and tested fittings.

The frames and door, glazed window, or panel assemblies are painted prior to assembly, and they are provided with all the elements and fittings that they require in order to operate.

The door assemblies are adjusted in their respective frames before the frames are mounted.

The vehicle may include a plurality of frames and door, glazed window, or panel assemblies.

The elements and fittings are, for example, finishing strips, lighting, ventilation, and interior trim.

A non load-bearing lightweight face framework 11 may be fixed between the frames so as to receive trim panels.

Glazed windows may also be fixed to a lightweight structure so as to form the faces of the vehicle, e.g. by means of an adhesive.

Easily interchangeable top and bottom panels may also be fixed to a lightweight structure by using an adhesive, bolts, or snap-fastening means.

Covering strips are fixed on by means of clips at the appropriate places.

End modules are fastened by using bolts, rivets, or any other suitable assembly means.

The invention also relates to a method of assembling a rail or road vehicle.

The rail or road vehicle includes a chassis 1 and a roof 2, the chassis and the roof both being structural elements, each of which forms a single unit only, the two elements defining a right side plane 3 and a left side plane 4.

Furthermore, at least one structural frame 5 is disposed in each of the side planes 3 & 4, each frame being secured at its bottom 6 to the chassis 1 and at its top 7 to the roof 2 so that the frames 5 are the only self-supporting structures in the vehicle.

In the method of the invention, at least one door assembly 8, at least one glazed window assembly 9, or at least one panel assembly 10 is mounted in at least one of the frames 5.

As defined above, the frames 5 are structural elements that are welded, machined, molded, or forged from a composite material, or from a material obtained by means of any other suitable technique.

The frames are fastened to the chassis 1 and to the roof 2 by means of bolts or rivets, or any other suitable fastening means.

The frames 5 and the assemblies 8, 9, 10 that they contain are painted, adjusted, and provided with fittings and/or trim before the frames 5 are fastened to the chassis 1 and to the roof 2.

We claim:

1. A rail or road vehicle comprising:
    a chassis which is a one-piece, unitary structural element;
    a roof which is a one-piece, unitary structural element, said chassis and said roof defining a right side wall portion and a left side wall portion;
    at least one structural side frame disposed between said chassis and said roof on each of said right side wall portion and said left side wall portion and having a bottom secured to said chassis and a top secured to said roof; and
    at least one non-structural, nonload-bearing face framework disposed next to said at least one structural side frame on each of said right side wall portion and said left side wall portion, thereby to define face zones which do not participate in providing mechanical strength for said vehicle,
    wherein said at least one structural side frame on said right side wall portion and said at least one structural side frame on said left side wall portion are the only self-supporting face structures of said vehicle, and further wherein said chassis, said roof, and said structural side frames are fully prefabricated independently of one another.

2. The vehicle according to claim 1, in which at least one of the structural side frames include at least one door assembly.

3. The vehicle according to claim 1, in which at least one of the structural side frames includes at least one glazed window assembly.

4. The vehicle according to claim 1, in which at least one of the structural side frames includes at least one panel assembly.

5. The vehicle according to claim 1, in which the structural side frames are structural elements that are one of welded, machined, molded, and forged from a composite material.

6. The vehicle according to claim 1, in which the structural side frames are fastened to said chassis and to said roof of the vehicle by being bolted or riveted over their entire widths.

7. The vehicle according to claim 1, in which the structural side frames and their assemblies are painted, adjusted, and provided with fittings and/or trim before said structural side frames are fastened to said chassis and to said roof.

8. A method of assembling a rail or road vehicle, said method comprising the steps of:
    a) providing a fully, independently prefabricated chassis which is a one-piece, unitary structural element;
    b) providing a fully, independently prefabricated roof which is a one-piece, unitary structural element, the chassis and the roof defining a right side wall portion and a left side wall portion;
    c) disposing at least one fully, independently prefabricated structural side frame between the chassis and the roof on each of said right side wall portion and said left side wall portion;
    d) securing a bottom of each structural side frame to the chassis and securing a top of each structural side frame to the roof, so that said structural side frames are the only self-supporting face structures of said vehicle; and
    e) disposing at least one non-structural, nonload-bearing face framework next to said at least one structural side frame on each of said right side wall portion and said left side wall portion, thereby to define face zones which do not participate in providing mechanical strength for said vehicle.

9. The method of claim 8, further comprising mounting at least one door assembly in at least one of said structural side frames.

10. The method of claim 8, further comprising mounting at least one glazed window assembly in at least one of said structural side frames.

11. The method of claim 8, further comprising mounting at least one panel assembly in at least one of said structural side frames.

12. The method of claim 8, in which the structural side frames are structural elements formed by one of welding, machining, molding and forging from a composite material.

13. The method of claim 8, in which said securing step comprises fastening said structural side frames to said chassis and said roof by one of bolting and riveting over their entire widths.

14. The method of claim 8, further comprising painting, adjusting, and providing fittings and/or trim to the structural side frames prior to securing the structural side frames to the chassis and to the roof.

* * * * *